(12) United States Patent
McCormick

(10) Patent No.: US 8,904,049 B2
(45) Date of Patent: Dec. 2, 2014

(54) BATTERY PACK MONITORING SYSTEM AND METHOD FOR ASSIGNING A BINARY ID TO A MICROPROCESSOR IN THE BATTERY PACK MONITORING SYSTEM

(75) Inventor: Richard McCormick, Troy, MI (US)

(73) Assignee: LG Chem, Ltd., Seoul (KR)

( * ) Notice: Subject to any disclaimer, the term of this patent is extended or adjusted under 35 U.S.C. 154(b) by 345 days.

(21) Appl. No.: 13/592,980

(22) Filed: Aug. 23, 2012

(65) Prior Publication Data

US 2014/0059260 A1 Feb. 27, 2014

(51) Int. Cl.
G06F 3/00 (2006.01)
H02J 7/00 (2006.01)
H01M 2/00 (2006.01)

(52) U.S. Cl.
USPC .................. 710/9; 320/134; 429/61

(58) Field of Classification Search
USPC ................ 710/9, 10, 110, 305, 313; 320/134; 429/61
See application file for complete search history.

(56) References Cited

U.S. PATENT DOCUMENTS

| | | |
|---|---|---|
| 4,775,931 A | 10/1988 | Dickie et al. |
| 4,951,385 A | 8/1990 | Desanto |
| 5,237,257 A | 8/1993 | Johnson et al. |
| 5,420,987 A | 5/1995 | Reid et al. |
| 5,491,830 A | 2/1996 | Ferri |
| 5,530,895 A | 6/1996 | Enstrom |
| 5,654,623 A | 8/1997 | Shiga et al. |
| 5,666,557 A | 9/1997 | Cassidy et al. |
| 5,698,140 A | 12/1997 | Lamb et al. |
| 5,727,169 A | 3/1998 | Calzi |
| 5,727,184 A | 3/1998 | Richter et al. |
| 6,094,053 A | 7/2000 | Harvey |
| 6,339,831 B1 | 1/2002 | Sugawara et al. |
| 6,434,632 B1 | 8/2002 | Hall |
| 6,442,640 B1 | 8/2002 | Eby et al. |
| 6,564,278 B1 | 5/2003 | Olson |
| 6,615,285 B1 | 9/2003 | Schafranek et al. |
| 6,794,849 B2 | 9/2004 | Mori et al. |
| 7,228,447 B1 | 6/2007 | Day |
| 7,245,501 B2 | 7/2007 | Kotson et al. |
| 7,394,394 B2 | 7/2008 | Lockhart et al. |
| 7,558,701 B2 | 7/2009 | Andarawis et al. |
| 7,576,518 B2 | 8/2009 | Sanders et al. |

(Continued)

FOREIGN PATENT DOCUMENTS

KR 20120076068 A 7/2012

OTHER PUBLICATIONS

DS2436 Battery ID/Monitor Chip, Dallas Semiconductor, undated.*

*Primary Examiner* — Khanh Dang
(74) *Attorney, Agent, or Firm* — Buckert Patent & Trademark Law Firm, P.C.; John F. Buckert

(57) ABSTRACT

A battery pack monitoring system is provided. The system includes a master microprocessor and a first microprocessor. The master microprocessor outputs a first signal from an output port thereof to induce an input port of the first microprocessor to have a first low logic voltage. The master microprocessor sends a message having a first binary ID from the communication bus port thereof through a communication bus after outputting the first signal. The first microprocessor receives the first binary ID at the communication bus port thereof and stores the first binary ID in a non-volatile memory of the first microprocessor when the input port of the first microprocessor has the first low logic voltage.

11 Claims, 5 Drawing Sheets

(56) References Cited

U.S. PATENT DOCUMENTS

| | | |
|---|---|---|
| 7,710,073 B2 | 5/2010 | Yamauchi et al. |
| 7,962,661 B2 | 6/2011 | Robertson et al. |
| 8,076,016 B2 * | 12/2011 | Baglino et al. .................. 429/61 |
| 8,426,047 B2 * | 4/2013 | Emori et al. ..................... 429/61 |
| 2003/0138690 A1 * | 7/2003 | Matsui ............................ 429/61 |
| 2006/0017582 A1 | 1/2006 | Lockhart et al. |
| 2006/0139007 A1 | 6/2006 | Kim |
| 2007/0118301 A1 | 5/2007 | Andarawis et al. |
| 2008/0071473 A1 | 3/2008 | Choi |
| 2008/0143543 A1 | 6/2008 | Vandensande et al. |
| 2008/0180106 A1 | 7/2008 | Gorbold |
| 2009/0009176 A1 * | 1/2009 | Nakao ........................... 324/432 |
| 2009/0027009 A1 * | 1/2009 | Sivertsen ....................... 320/134 |
| 2009/0146610 A1 * | 6/2009 | Trigiani ........................ 320/119 |
| 2009/0164154 A1 * | 6/2009 | Ishikawa et al. ................. 702/63 |
| 2010/0097034 A1 | 4/2010 | Shu et al. |
| 2010/0241377 A1 | 9/2010 | Kagawa |
| 2011/0140533 A1 * | 6/2011 | Zeng et al. ...................... 307/80 |
| 2011/0154084 A1 | 6/2011 | Vandwalle et al. |
| 2011/0175574 A1 * | 7/2011 | Sim et al. ...................... 320/121 |
| 2011/0216460 A1 | 9/2011 | Yu et al. |
| 2011/0258471 A1 | 10/2011 | Daniel et al. |
| 2012/0188086 A1 | 7/2012 | Xie et al. |
| 2012/0274281 A1 | 11/2012 | Kim |
| 2013/0038972 A1 * | 2/2013 | Yang et al. ...................... 361/90 |

* cited by examiner

BATTERY PACK MONITORING SYSTEM AND METHOD FOR ASSIGNING A BINARY ID TO A MICROPROCESSOR IN THE BATTERY PACK MONITORING SYSTEM

BACKGROUND

The inventor herein has recognized a need for an improved battery pack monitoring system and a method for assigning a binary ID to a microprocessor in the battery pack monitoring system.

SUMMARY

A battery pack monitoring system in accordance with an exemplary embodiment is provided. The battery pack monitoring system includes a master microprocessor having an input port, an output port, and a communication bus port. The communication bus port of the master microprocessor is operably coupled to a communication bus. The battery pack monitoring system further includes a first microprocessor having an input port, an output port, and a communication bus port. The communication bus port of the first microprocessor is operably coupled to the communication bus. The battery pack monitoring system further includes a second microprocessor having an input port, an output port, and a communication bus port. The communication bus port of the second microprocessor is operably coupled to the communication bus. The battery pack monitoring system further includes a first over-voltage protection circuit electrically coupled between the output port of the master microprocessor and the input port of the first microprocessor. The battery pack monitoring system further includes a second over-voltage protection circuit electrically coupled between the output port of the first microprocessor and the input port of the second microprocessor. The master microprocessor is configured to output a first signal from the output port thereof to induce the input port of the first microprocessor to have a first low logic voltage. The master microprocessor is further configured to send a message having a first binary ID from the communication bus port thereof through the communication bus after outputting the first signal. The first microprocessor is configured to receive the first binary ID at the communication bus port thereof and to store the first binary ID in a non-volatile memory of the first microprocessor when the input port of the first microprocessor has the first low logic voltage.

A method for assigning a binary ID to a microprocessor in a battery pack monitoring system in accordance with another exemplary embodiment. The battery pack monitoring system includes a master microprocessor with an input port, an output port, and a communication bus port. The communication bus port of the master microprocessor is operably coupled to a communication bus. The battery pack monitoring system further includes a first microprocessor having an input port, an output port, and a communication bus port. The communication bus port of the first microprocessor is operably coupled to the communication bus. The battery pack monitoring system further includes a second microprocessor having an input port, an output port, and a communication bus port. The communication bus port of the second microprocessor is operably coupled to the communication bus. The battery pack monitoring system further includes a first over-voltage protection circuit electrically coupled between the output port of the master microprocessor and the input port of the first microprocessor. The battery pack monitoring system further includes a second over-voltage protection circuit electrically coupled between the output port of the first micropro-cessor and the input port of the second microprocessor. The method includes outputting a first signal from the output port of the master microprocessor to induce the input port of the first microprocessor to have a first low logic voltage. The method further includes sending a message having a first binary ID from the communication bus port of the master microprocessor through the communication bus after generating the first signal. The method further includes receiving the first binary ID at the communication bus port of the first microprocessor. The method further includes storing the first binary ID in a non-volatile memory of the first microprocessor when the input port of the first microprocessor has the first low logic voltage.

DETAILED DESCRIPTION

Figure 1:
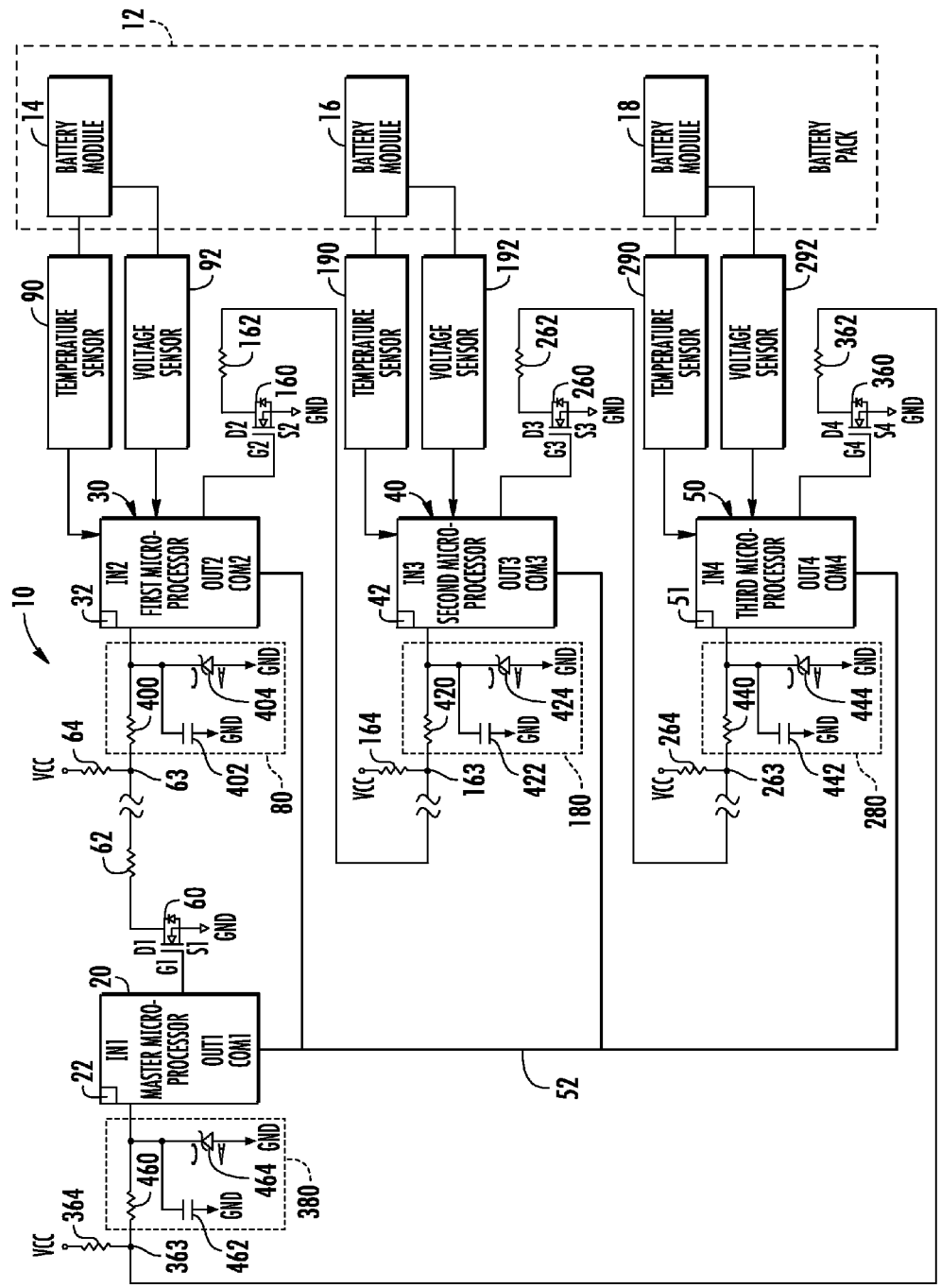
FIG. 1 is a schematic of a battery pack monitoring system in accordance with an exemplary embodiment.
Figure 2:
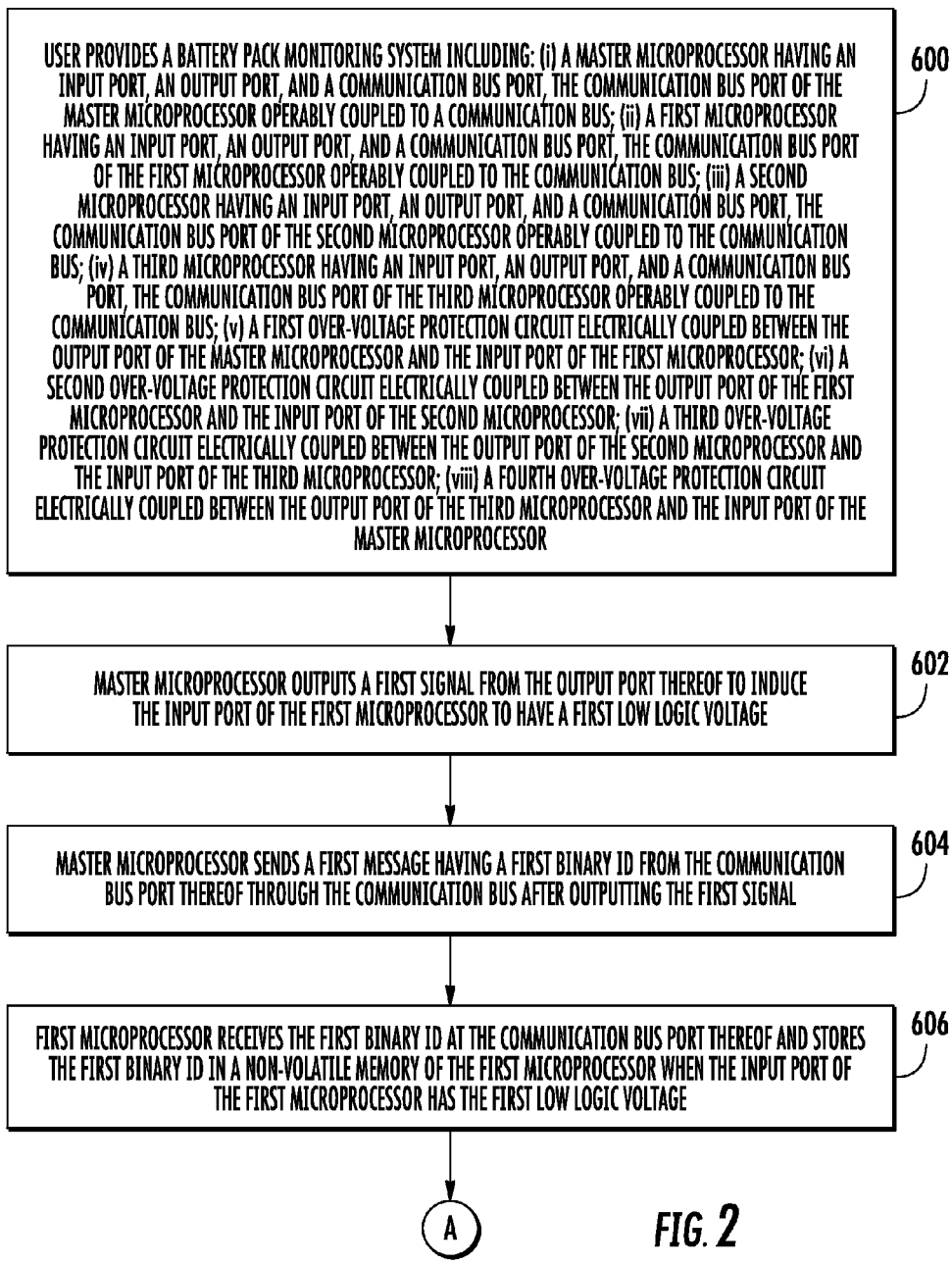
FIGS. 2-5 are flowcharts of a method for assigning binary IDs to microprocessors the battery pack monitoring system of FIG. 1 in accordance with another exemplary embodiment.
Figure 3:
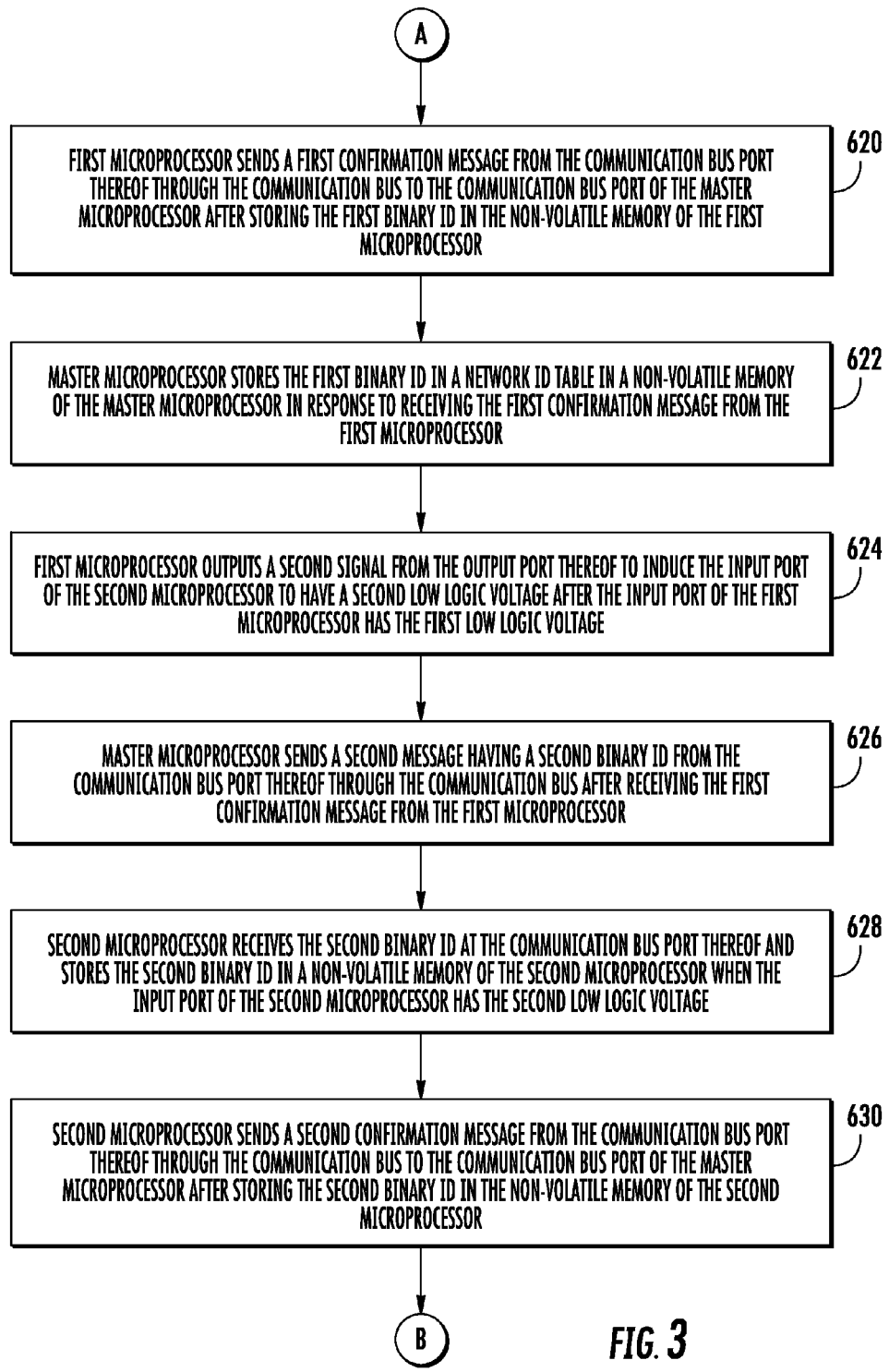
Figure 4:
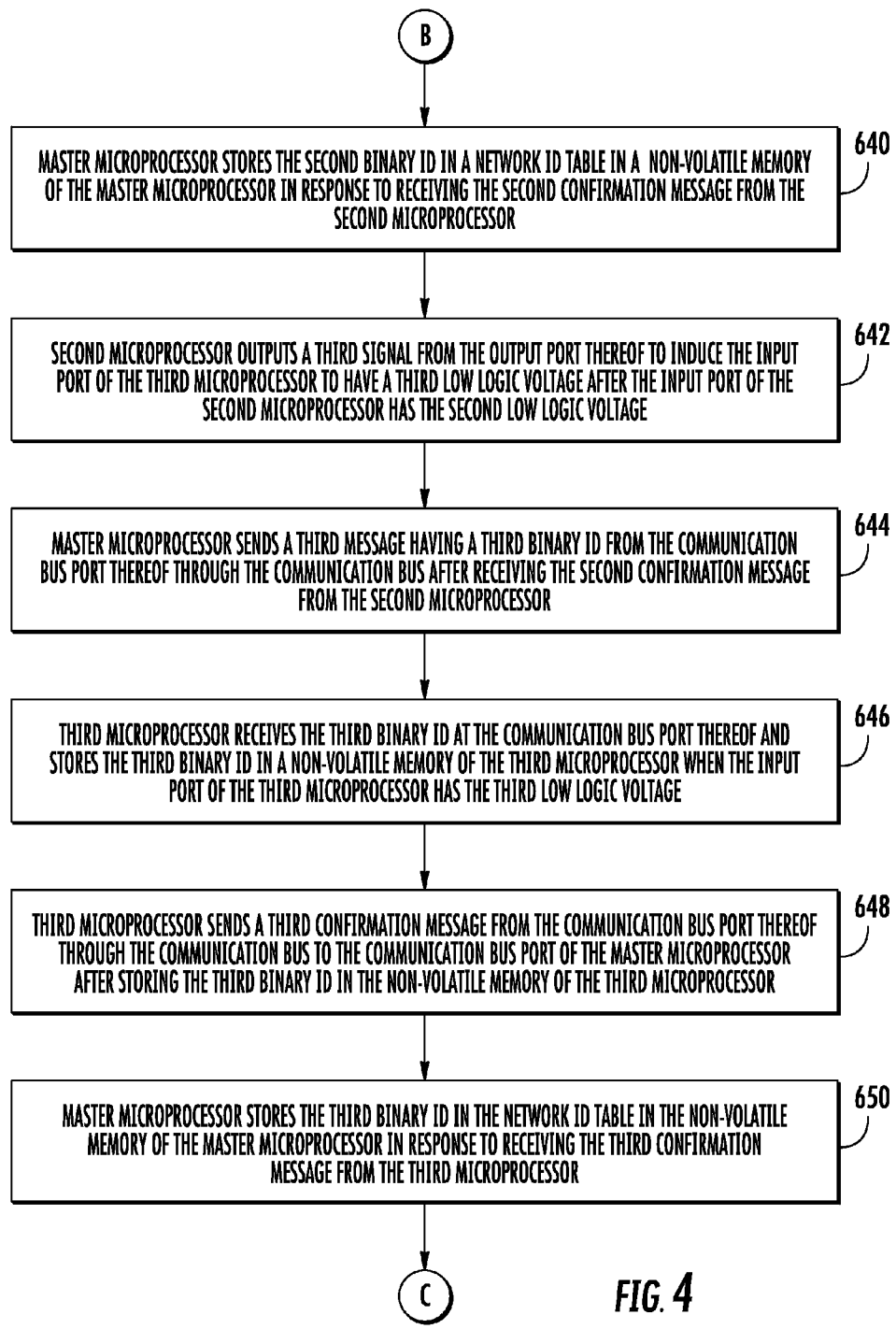
Figure 5:
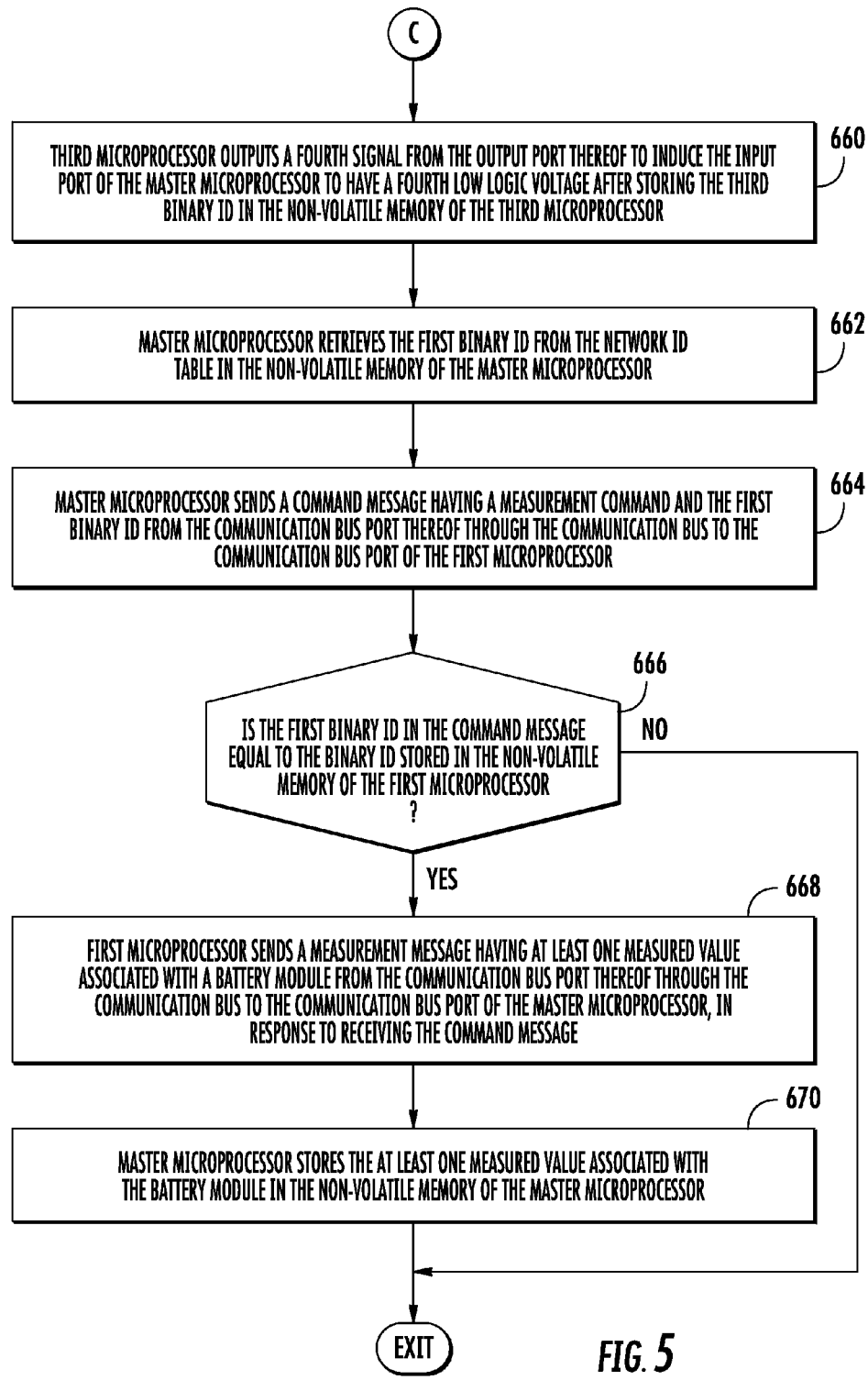

Referring to FIG. 1, a battery pack monitoring system 10 for monitoring operational parameters of the battery pack 12 in accordance with an exemplary embodiment is illustrated. The battery pack monitoring system 10 includes battery modules 14, 16, 18. The battery pack monitoring system 10 includes a master microprocessor 20, a first microprocessor 30, a second microprocessor 40, a third microprocessor 50, a transistor 60, resistors 62, 64, a first over-voltage protection circuit 80, a temperature sensor 90, a voltage sensor 92, a transistor 160, resistors 162, 164, a second over-voltage protection circuit 180, a temperature sensor 190, a voltage sensor 192, a transistor 260, resistors 262, 264, a third over-voltage protection circuit 280, a temperature sensor 290, a voltage sensor 292, the transistor 360, resistors 362, 364, and a fourth over-voltage protection circuit 380. An advantage of the battery pack monitoring system 10 is that the system 10 utilizes an outputted signal from each microprocessor in the system 10 and a respective binary ID from the master microprocessor 20 to program a subsequent microprocessor with the respective binary ID.

The master microprocessor 20 has an input port IN1, an output port OUT1, a communication bus port COM1, and a non-volatile memory 22. The communication bus port COM1 is operably coupled to the communication bus 52. The master microprocessor 20 is configured to transmit messages from the communication bus port COM1 through the communication bus 52 to the first, second, and third microprocessors 30, 40, 50, for assigning first, second, and third binary IDs respectfully, thereto. The master microprocessor 20 utilizes the first, second, and third binary IDs for further communication with the first, second, and third microprocessors 30, 40, 50, respectively.

The transistor 60 has a gate G1, a source S1, and a drain D1, and a diode electrically coupled between the drain D1 and the source S1. The gate G1 is electrically coupled to the output port OUT1 of the master microprocessor 20. The source S1 is electrically coupled to the electrical ground. The drain D1 is electrically coupled to a first end of the resistor 62. The resistor 62 is electrically coupled in series between the drain D1 and a node 63. The resistor 64 is electrically coupled between a voltage source Vcc and the node 63. The first over-voltage protection circuit 80 is electrically coupled between the node 63 and an input port IN2 of the first microprocessor 30.

When the master microprocessor 20 does not output a high logic voltage from the output port OUT1, the transistor 60 is turned off and the input port IN2 has a high logic voltage applied thereto from the voltage source Vcc. The first over-voltage protection circuit 80 limits an amplitude of the high logic voltage applied to the input port IN2 to less than a predetermined voltage level. The first over-voltage protection circuit 80 includes a resistor 400, a capacitor 402 and a zener diode 404. The resistor 400 is electrically coupled between the node 63 and the input port IN2 of the first microprocessor 30. The capacitor 402 is electrically coupled between the input port IN2 and electrical ground. The zener diode 404 has a cathode electrically coupled to the input port IN2 and an anode electrode electrically coupled to electrical ground such that the zener diode 404 limits a voltage amplitude applied to the input port IN2 to less than a predetermined voltage level.

When the master microprocessor 20 outputs a high logic voltage (e.g., 5 Vdc) from the output port OUT1, the transistor 60 is turned on and the input port IN2 has a low logic voltage (e.g., <0.5 Vdc) applied thereto. When the input port IN2 has a low logic voltage applied thereto, the first microprocessor 30 enters a programming mode that will accept and store a binary ID from a message received at the communication bus port COM2.

The first microprocessor 30 has the input port IN2, an output port OUT2, a communication bus port COM2, and a non-volatile memory 32. The communication bus port COM2 is operably coupled to the communication bus 52. The first microprocessor 30 is configured to receive a first binary ID from the master microprocessor 20 and to store the first binary ID within the non-volatile memory 32 as will be explained in greater detail below. The first microprocessor 30 is further electrically coupled to the temperature sensor 90 and the voltage sensor 92. The temperature sensor 90 generates a temperature signal indicative of a temperature level of the battery module 14 that is received by the first microprocessor 30. The voltage sensor 92 generates a voltage signal indicative of a voltage level output by the battery module 14 that is received by the first microprocessor 30.

The transistor 160 has a gate G2, a source S2, and a drain D2, and a diode electrically coupled between the drain D2 and the source S2. The gate G2 is electrically coupled to the output port OUT2 of the first microprocessor 30. The source S2 is electrically coupled to the electrical ground. The drain D2 is electrically coupled to a first end of the resistor 162. The resistor 162 is electrically coupled in series between the drain D2 and a node 163. The resistor 164 is electrically coupled between the voltage source Vcc and the node 163. The second over-voltage protection circuit 180 is electrically coupled between the node 163 and an input port IN3 of the second microprocessor 40.

When the first microprocessor 30 does not output a high logic voltage from the output port OUT2, the transistor 160 is turned off and the input port IN3 has a high logic voltage applied thereto from the voltage source Vcc. The second over-voltage protection circuit 180 limits an amplitude of the high logic voltage applied to the input port IN3 to less than a predetermined voltage level. The second over-voltage protection circuit 180 includes a resistor 420, a capacitor 422 and a zener diode 424. The resistor 420 is electrically coupled between the node 163 and the input port IN3 of the second microprocessor 40. The capacitor 422 is electrically coupled between the input port IN3 and electrical ground. The zener diode 424 has a cathode electrically coupled to the input port IN3 and an anode electrode electrically coupled to electrical ground such that the zener diode 424 limits a voltage amplitude applied to the input port IN3 to less than a predetermined voltage level.

When the first microprocessor 30 outputs a high logic voltage from the output port OUT2, the transistor 160 is turned on and the input port IN3 has a low logic voltage applied thereto. When the input port IN3 has a low logic voltage applied thereto, the second microprocessor 40 enters a programming mode that will accept and store a binary ID from a message received at the communication bus port COM3.

The second microprocessor 40 has the input port IN3, an output port OUT3, a communication bus port COM3, and a non-volatile memory 42. The communication bus port COM3 is operably coupled to the communication bus 52. The second microprocessor 40 is configured to receive a second binary ID from the master microprocessor 20 and to store the second binary ID within the non-volatile memory 42 as will be explained in greater detail below. The second microprocessor 40 is further electrically coupled to the temperature sensor 190 and the voltage sensor 192. The temperature sensor 190 generates a temperature signal indicative of a temperature level of the battery module 16 that is received by the second microprocessor 40. The voltage sensor 192 generates a voltage signal indicative of a voltage level output by the battery module 16 that is received by the second microprocessor 40.

The transistor 260 has a gate G3, a source S3, and a drain D3, and a diode electrically coupled between the drain D3 and the source S3. The gate G3 is electrically coupled to the output port OUT3 of the second microprocessor 40. The source S3 is electrically coupled to the electrical ground. The drain D3 is electrically coupled to a first end of the resistor 262. The resistor 262 is electrically coupled in series between the drain D3 and a node 263. The resistor 264 is electrically coupled between the voltage source Vcc and the node 263. The third over-voltage protection circuit 280 is electrically coupled between the node 263 and an input port IN4 of the third microprocessor 50.

When the second microprocessor 40 does not output a high logic voltage from the output port OUT3, the transistor 260 is turned off and the input port IN4 has a high logic voltage applied thereto from the voltage source Vcc. The third over-voltage protection circuit 280 limits an amplitude of the high logic voltage applied to the input port IN4 to less than a predetermined voltage level. The third over-voltage protection circuit 280 includes a resistor 440, a capacitor 442 and a zener diode 444. The resistor 440 is electrically coupled between the node 263 and the input port IN4 of the third microprocessor 50. The capacitor 442 is electrically coupled between the input port IN4 and electrical ground. The zener diode 444 has a cathode electrically coupled to the input port IN4 and an anode electrode electrically coupled to electrical ground such that the zener diode 444 limits a voltage amplitude applied to the input port IN4 to less than a predetermined voltage level.

When the second microprocessor 40 outputs a high logic voltage from the output port OUT3, the transistor 260 is turned on and the input port IN4 has a low logic voltage applied thereto. When the input port IN4 has a low logic voltage applied thereto, the third microprocessor 50 enters a programming mode that will accept and store a binary ID from a message received at the communication bus port COM4.

The third microprocessor 50 has the input port IN4, an output port OUT4, a communication bus port COM4, and a non-volatile memory 51. The communication bus port COM4 is operably coupled to the communication bus 52. The third microprocessor 50 is configured to receive a third binary ID from the master microprocessor 20 and to store the third binary ID within the non-volatile memory 51 as will be explained in greater detail below. The third microprocessor 50 is further electrically coupled to the temperature sensor 290 and the voltage sensor 292. The temperature sensor 290 generates a temperature signal indicative of a temperature level of the battery module 18 that is received by the third microprocessor 50. The voltage sensor 292 generates a voltage signal indicative of a voltage level output by the battery module 18 that is received by the third microprocessor 50.

The transistor 360 has a gate G4, a source S4, and a drain D4, and a diode electrically coupled between the drain D4 and the source S4. The gate G4 is electrically coupled to the output port OUT4 of the third microprocessor 50. The source S4 is electrically coupled to the electrical ground. The drain D4 is electrically coupled to a first end of the resistor 362. The resistor 362 is electrically coupled in series between the drain D4 and a node 363. The resistor 364 is electrically coupled between the voltage source Vcc and the node 363. The fourth over-voltage protection circuit 380 is electrically coupled between the node 363 and an input port IN1 of the master microprocessor 20.

When the third microprocessor 50 does not output a high logic voltage from the output port OUT4, the transistor 360 is turned off and the input port IN1 has a high logic voltage applied thereto from the voltage source Vcc. The fourth over-voltage protection circuit 380 limits an amplitude of the high logic voltage applied to the input port IN1 to less than a predetermined voltage level. The fourth over-voltage protection circuit 380 includes a resistor 460, a capacitor 462 and a zener diode 464. The resistor 460 is electrically coupled between the node 363 and the input port IN1 of the master microprocessor 20. The capacitor 462 is electrically coupled between the input port IN1 and electrical ground. The zener diode 464 has a cathode electrically coupled to the input port IN1 and an anode electrode electrically coupled to electrical ground such that the zener diode 464 limits a voltage amplitude applied to the input port IN1 to less than a predetermined voltage level.

When the third microprocessor 50 outputs a high logic voltage from the output port OUT4, the transistor 360 is turned on and the input port IN1 has a low logic voltage applied thereto. When the input port IN1 has a low logic voltage applied thereto, the master microprocessor 20 stops sending binary IDs through the communication bus 52.

Referring to FIGS. 1-5, a flowchart of a method for assigning binary IDs to microprocessors in the battery pack monitoring system 10 in accordance with another exemplary embodiment will now be described.

At step 600, a user provides the battery pack monitoring system 10 including: (i) the master microprocessor 20 having the input port IN1, the output port OUT1, and the communication bus port COM1, the communication bus port COM1 of the master microprocessor 20 operably coupled to the communication bus 52; (ii) the first microprocessor 30 having the input port IN2, the output port OUT2, and the communication bus port COM2, the communication bus port COM2 of the first microprocessor 30 operably coupled to the communication bus 52; (iii) the second microprocessor 40 having the input port IN3, the output port OUT3, and the communication bus port COM3, the communication bus port COM3 of the second microprocessor 40 operably coupled to the communication bus 52; (iv) the third microprocessor 50 having the input port IN4, the output port OUT4, and the communication bus port COM4, the communication bus port COM4 of the third microprocessor 50 operably coupled to the communication bus 52; (v) the first over-voltage protection circuit 80 electrically coupled between the output port OUT1 of the master microprocessor 20 and the input port IN2 of the first microprocessor 30; (vi) the second over-voltage protection circuit 180 electrically coupled between the output port OUT2 of the first microprocessor 30 and the input port IN3 of the second microprocessor 40; (vii) the third over-voltage protection circuit 280 electrically coupled between the output port OUT3 of the second microprocessor 40 and the input port IN4 of the third microprocessor 50; and (viii) the fourth over-voltage protection circuit 380 electrically coupled between the output port OUT4 of the third microprocessor 50 and the input port IN1 of the master microprocessor 20.

At step 602, the master microprocessor 20 outputs a first signal from the output port OUT1 thereof to induce the input port IN2 of the first microprocessor 30 to have a first low logic voltage.

At step 604, the master microprocessor 20 sends a first message having a first binary ID from the communication bus port COM1 thereof through the communication bus 52 after outputting the first signal.

At step 606, the first microprocessor 30 receives the first binary ID at the communication bus port COM2 thereof and stores the first binary ID in the non-volatile memory 32 of the first microprocessor 30 when the input port IN2 of the first microprocessor 30 has the first low logic voltage.

At step 620, the first microprocessor 30 sends a first confirmation message from the communication bus port COM2 thereof through the communication bus 52 to the communication bus port COM1 of the master microprocessor 20 after storing the first binary ID in the non-volatile memory 32 of the first microprocessor 30.

At step 622, the master microprocessor 20 stores the first binary ID in a network ID table in the non-volatile memory 22 of the master microprocessor 20 in response to receiving the first confirmation message from the first microprocessor 30.

At step 624, the first microprocessor 30 outputs a second signal from the output port OUT2 thereof to induce the input port IN3 of the second microprocessor 40 to have a second low logic voltage after the input port IN2 of the first microprocessor 30 has the first low logic voltage.

At step 626, the master microprocessor 20 sends a second message having a second binary ID from the communication bus port COM1 thereof through the communication bus 52 after receiving the first confirmation message from the first microprocessor 30.

At step 628, the second microprocessor 40 receives the second binary ID at the communication bus port COM3 thereof and stores the second binary ID in the non-volatile memory 42 of the second microprocessor 40 when the input port IN3 of the second microprocessor 40 has the second low logic voltage.

At step 630, the second microprocessor 40 sends a second confirmation message from the communication bus port COM3 thereof through the communication bus 52 to the communication bus port COM1 of the master microprocessor 20 after storing the second binary ID in the non-volatile memory 42 of the second microprocessor 40.

At step 640, the master microprocessor 20 stores the second binary ID in the network ID table in the non-volatile memory 22 of the master microprocessor 20 in response to receiving the second confirmation message from the second microprocessor 40.

At step 642, the second microprocessor 40 outputs a third signal from the output port OUT3 thereof to induce the input port IN4 of the third microprocessor 50 to have a third low logic voltage after the input port IN3 of the second microprocessor 40 has the second low logic voltage.

At step 644, the master microprocessor 20 sends a third message having a third binary ID from the communication bus port COM1 thereof through the communication bus 52 after receiving the second confirmation message from the second microprocessor 40.

At step 646, the third microprocessor 50 receives the third binary ID at the communication bus port COM4 thereof and stores the third binary ID in the non-volatile memory 51 of the third microprocessor 50 when the input port IN4 of the third microprocessor 50 has the third low logic voltage.

At step 648, the third microprocessor 50 sends a third confirmation message from the communication bus port COM4 thereof through the communication bus 52 to the communication bus port COM1 of the master microprocessor 20 after storing the third binary ID in the non-volatile memory 51 of the third microprocessor 50.

At step 650, the master microprocessor 20 stores the third binary ID in the network ID table in the non-volatile memory 22 of the master microprocessor 20 in response to receiving the third confirmation message from the third microprocessor 50.

At step 660, the third microprocessor 50 outputs a fourth signal from the output port OUT4 thereof to induce the input port IN1 of the master microprocessor 20 to have a fourth low logic voltage after storing the third binary ID in the non-volatile memory 51 of the third microprocessor 50.

At step 662, the master microprocessor 20 retrieves the first binary ID from the network ID table in the non-volatile memory 22 of the master microprocessor 20.

At step 664, the master microprocessor 20 sends a command message having a measurement command and the first binary ID from the communication bus port COM1 thereof through the communication bus 52 to the communication bus port COM2 of the first microprocessor 30.

At step 666, the first microprocessor 30 makes a determination as to whether the first binary ID in the command message is equal to the binary ID stored in the non-volatile memory 32 of the first microprocessor 30. If the value of step 666 equals "yes", the method advances to step 668. Otherwise, the method is exited.

At step 668, the first microprocessor 30 sends a measurement message having at least one measured value associated with a battery module 14 from the communication bus port COM2 thereof through the communication bus 52 to the communication bus port COM1 of the master microprocessor 20, in response to receiving the command message.

At step 670, the master microprocessor 20 stores the at least one measured value associated with the battery module 14 in the non-volatile memory 22 of the master microprocessor 20. After step 670, the method is exited.

The battery pack monitoring system 10 and the method of assigning binary IDs to microprocessors in the system provide a substantial advantage over other systems and methods. In particular, the battery pack monitoring system 10 and the method provide a technical effect of utilizing an outputted signal from each microprocessor in the system 10 and a respective binary ID from the master microprocessor 20 to program a subsequent microprocessor with the respective binary ID.

The above-described method can be at least partially embodied in the form of one or more computer readable media having computer-executable instructions for practicing the methods. The computer-readable media can comprise one or more of the following: hard drives, RAM memory, flash memory, and other computer-readable media known to those skilled in the art; wherein, when the computer-executable instructions are loaded into and executed by one or more computers or microprocessors, the one or more computers or microprocessors become an apparatus for practicing the methods.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack monitoring system, comprising:
a master microprocessor having an input port, an output port, and a communication bus port, the communication bus port of the master microprocessor operably coupled to a communication bus;
a first microprocessor having an input port, an output port, and a communication bus port, the communication bus port of the first microprocessor operably coupled to the communication bus;
a second microprocessor having an input port, an output port, and a communication bus port, the communication bus port of the second microprocessor operably coupled to the communication bus;
a first over-voltage protection circuit electrically coupled between the output port of the master microprocessor and the input port of the first microprocessor;
a second over-voltage protection circuit electrically coupled between the output port of the first microprocessor and the input port of the second microprocessor;
the master microprocessor configured to output a first signal from the output port thereof to induce the input port of the first microprocessor to have a first low logic voltage, the master microprocessor further configured to send a message having a first binary ID from the communication bus port thereof through the communication bus after outputting the first signal; and
the first microprocessor configured to receive the first binary ID at the communication bus port thereof and to store the first binary ID in a non-volatile memory of the first microprocessor when the input port of the first microprocessor has the first low logic voltage.

2. The battery pack monitoring system of claim 1, wherein the first microprocessor further configured to send a confirmation message from the communication bus port thereof through the communication bus to the communication bus port of the master microprocessor after storing the first binary ID in the non-volatile memory of the first microprocessor.

3. The battery pack monitoring system of claim 2, wherein:
the first microprocessor further configured to output a second signal from the output port thereof to induce the input port of the second microprocessor to have a second low logic voltage after storing the first binary ID;
the master microprocessor further configured to send a message having a second binary ID from the communication bus port thereof through the communication bus after receiving the confirmation message from the first microprocessor; and the second microprocessor configured to receive the second binary ID at the communication bus port thereof and to store the second binary ID in a non-volatile memory of the second microprocessor when the input port of the second microprocessor has the second low logic voltage.

4. The battery pack monitoring system of claim 3, wherein the second microprocessor further configured to send a confirmation message from the communication bus port thereof through the communication bus to the communication bus port of the master microprocessor after storing the second binary ID in the non-volatile memory of the second microprocessor.

5. The battery pack monitoring system of claim 4, further comprising:
- a third microprocessor having an input port, an output port, and a communication bus port, the communication bus port of the third microprocessor operably coupled to the communication bus;
- a third over-voltage protection circuit electrically coupled between the output port of the second microprocessor and the input port of the third microprocessor;
- the second microprocessor further configured to output a third signal from the output port thereof to induce the input port of the third microprocessor to have a third low logic voltage after the input port of the second microprocessor has the second low logic voltage;
- the master microprocessor further configured to send a message having a third binary ID from the communication bus port thereof through the communication bus after receiving the confirmation message from the second microprocessor; and
- the third microprocessor configured to receive the third binary ID at the communication bus port thereof and to store the third binary ID in a non-volatile memory of the third microprocessor when the input port of the third microprocessor has the third low logic voltage.

6. The battery pack monitoring system of claim 5, wherein the third microprocessor further configured to send a confirmation message from the communication bus port thereof through the communication bus to the communication bus port of the master microprocessor after storing the third binary ID in the non-volatile memory of the third microprocessor.

7. The battery pack monitoring system of claim 6, wherein the third microprocessor further configured to output a fourth signal from the output port thereof to induce the input port of the master microprocessor to have a fourth low logic voltage after the input port of the third microprocessor has the third low logic voltage.

8. The battery pack monitoring system of claim 1, wherein the first over-voltage protection circuit comprises:
- a zener diode electrically coupled between the input port of the first microprocessor and electrical ground such that the zener diode limits a voltage amplitude applied to the input port of the first microprocessor to less than a predetermined voltage level;
- a capacitor electrically coupled between the input port of the first microprocessor and electrical ground; and
- a resistor electrically coupled between the input port of the first microprocessor and the output port of the master microprocessor.

9. The battery pack monitoring system of claim 1, wherein:
- the master microprocessor further configured to send a command message having a measurement command and the first binary ID from the communication bus port thereof through the communication bus to the communication bus port of the first microprocessor; and
- the first microprocessor further configured to send a measurement message having at least one measured value associated with a battery module from the communication bus port of the first microprocessor through the communication bus to the communication bus port of the master microprocessor, in response to receiving the command message.

10. A method for assigning a binary ID to a microprocessor in a battery pack monitoring system, the battery pack monitoring system having a master microprocessor with an input port, an output port, and a communication bus port, the communication bus port of the master microprocessor operably coupled to a communication bus; the battery pack monitoring system further having a first microprocessor having an input port, an output port, and a communication bus port, the communication bus port of the first microprocessor operably coupled to the communication bus; the battery pack monitoring system further having a second microprocessor having an input port, an output port, and a communication bus port, the communication bus port of the second microprocessor operably coupled to the communication bus; the battery pack monitoring system further having a first over-voltage protection circuit electrically coupled between the output port of the master microprocessor and the input port of the first microprocessor; the battery pack monitoring system further having a second over-voltage protection circuit electrically coupled between the output port of the first microprocessor and the input port of the second microprocessor; the method comprising:
- outputting a first signal from the output port of the master microprocessor to induce the input port of the first microprocessor to have a first low logic voltage;
- sending a message having a first binary ID from the communication bus port of the master microprocessor through the communication bus after generating the first signal; and
- receiving the first binary ID at the communication bus port of the first microprocessor, and
- storing the first binary ID in a non-volatile memory of the first microprocessor when the input port of the first microprocessor has the first low logic voltage.

11. The method of claim 10, further comprising:
- sending a command message having a measurement command and the first binary ID from the communication bus port of the master microprocessor through the communication bus to the communication bus port of the first microprocessor; and
- sending a measurement message having at least one measured value associated with a battery module from the communication bus port of the first microprocessor through the communication bus to the communication bus port of the master microprocessor, in response to receiving the command message.

* * * * *